(12) United States Patent
Calleja (10) Patent No.: US 6,619,490 B2
(45) Date of Patent: Sep. 16, 2003

(54) WAREHOUSE MATERIAL-RACK SAFETY NETTING SYSTEM

(76) Inventor: Michael J. Calleja, 110 San Benito Rd., Brisbane, CA (US) 94005

( * ) Notice: Subject to any disclaimer, the term of this patent is extended or adjusted under 35 U.S.C. 154(b) by 0 days.

(21) Appl. No.: 10/097,681

(22) Filed: Mar. 13, 2002

(65) Prior Publication Data

US 2002/0144966 A1 Oct. 10, 2002

Related U.S. Application Data

(63) Continuation-in-part of application No. 09/827,962, filed on Apr. 4, 2001.

(51) Int. Cl.[7] .................................................. A47F 5/00
(52) U.S. Cl. ........................ 211/183; 211/180; 211/191
(58) Field of Search ................................ 211/183, 180, 211/191

(56) References Cited

U.S. PATENT DOCUMENTS

| | | | |
|---|---|---|---|
| 4,830,382 A | * 5/1989 | Wheeler ...................... 473/492 |
| 4,981,225 A | 1/1991 | Cole | |
| 5,170,829 A | 12/1992 | Duncan et al. | |
| 5,573,125 A | 11/1996 | Denny | |
| 5,791,501 A | 8/1998 | Baldwin, Jr. | |
| 6,098,750 A | * 8/2000 | Reynolds et al. ........... 182/138 |
| 6,186,274 B1 | * 2/2001 | Reynolds et al. | |

OTHER PUBLICATIONS

Sinco/Sala, "Rack and Conveyor Guarding Systems", Sinco/Sala, Middletown, Connecticut, USA.
International Cordage East, "Protect Your Gross With Our Net", InCord, East Haddam, Connecticut, USA.
Bay Nets Safety System, "MezzNet Defense System", BayNets East Haddam, Connecticut, USA.

* cited by examiner

Primary Examiner—Daniel P. Stodola
Assistant Examiner—Erica B. Harris
(74) Attorney, Agent, or Firm—Robert Charles Hill

(57) ABSTRACT

A warehouse material-rack safety-netting system comprises left and right vertical extension posts that bolt to the face of the top bay of an open material rack. A two-part curtain netting that parts in the middle is supported between horizontal, parallel top-and-bottom wire ropes on hooks. The left and right edges of the curtain netting are hooked to the vertical extension posts with carabiners. In order to reduce inadvertent snagging, these hooks and wire ropes are critically attached along the middle line of the inside opposite-facing edges of the vertical extension posts. The front aisle-facing edges of these vertical extension posts are smooth and no part of the curtain netting extends past them when the curtains are fully closed. A latch is provided at the center to secure the two-parts of the curtain netting together.

4 Claims, 8 Drawing Sheets

WAREHOUSE MATERIAL-RACK SAFETY NETTING SYSTEM

RELATED COPENDING APPLICATIONS

This Application is a continuation-in-part of U.S. patent application Ser. No. 09/827,962, filed Apr. 4, 2001. Such application is incorporated herein by reference.

BACKGROUND OF THE INVENTION

1. Field of the Invention

The present invention relates to material-handling systems, and more particularly to safety netting that contains product on overhead shelves and that protect workers and customers below in the aisles.

2. Description of Related Art

Shelves and racks are a convenient way to store items, and stored many levels high, such can maximize floor space. A typical warehouse retail store like The Home Depot has material racks that are two, three, and four levels high. Heavy items, like backup store inventory on a pallet, is placed and fetched from high above by a forklift.

Heavy items placed ten to twenty feet high above aisles in material racks and on shelves can present a significant and not-so-rare personal injury risk. Shaking, bumping, and poorly stacked items can come tumbling down and hurt people below, or at a minimum damage the product.

Not surprisingly, a number of different devices and methods have evolved to address these problems. The Law too has entered the picture with OSHA regulations, and personal injury lawsuits. New company procedures, union work rules, and plain common sense now dictate that an effective restraint, barrier, or guard system be installed on the higher shelves and rack to prevent falling debris.

As could be expected, some methods and devices are better than others. Conventional safety products can be expensive to buy, and difficult to work with or install. A simple netting secured all around the shelf opening can be effective if the netting is strong enough and secured well. But the way the netting is secured and constructed can mean opening the net to access the shelf is made very difficult, in some cases requiring a technician to climb high above and use hand tools to open and/or close the net.

Sinco/Sala (Middletown, Conn.), InCord (East Haddam, Conn.), and others market rack guard systems that use different kinds of barriers and attachment hardware. For example, Sinco/Sala uses a nylon mesh that is stretched inside a perimeter frame of taut wire rope. So-called EZ-clips are used to attach the netting to the wire rope frame. InCord markets their SURE-GARD synthetic mesh that is able to stretch under load. A variety of mesh-size openings are offered for a range of contained item types and sizes.

A MEZZNET-DEFENSE-SYSTEM is marketed by Bay-Nets (East Haddam, Conn.) that raises and lowers flexible netting hung from a rod that is guided up and down by a pair of side posts. Open-sided mezzanines with these systems are accessed by operating a cable and pulley system that connects to the rod and runs inside the two side posts. The cable and pulleys can be manually cranked, or powered by an electric motor. BayNets' advertising literature suggests that these systems meet federal Occupational Safety and Health Administration (OSHA) fall-protection standards.

Screens and net that protrude out, or that have protruding fasteners, can hook and catch people and equipment operating nearby. So what is needed is a netting system that does not protrude into the aisle ways.

SUMMARY OF THE INVENTION

Briefly, a material-rack safety-netting embodiment of the present invention comprises left and right vertical extension posts that bolt to the face of the upper bay of a material rack. A two-part curtain netting that parts in the middle is supported between horizontal, parallel top-and-bottom wire ropes on hooks. The left and right edges of the curtain netting are secured to the vertical extension posts with more hooks. It is critical to the present invention that these hooks and wire ropes be attached along the middle line of the inside opposite-facing edges of the vertical extension posts. The front aisle-facing edges of these vertical extension posts are smooth and no part of the curtain netting extends past them when the curtains are fully closed. A latch is provided at the center to secure the two-parts of the curtain netting together.

An advantage of the present invention is that a safety netting is provided that does not get snagged by people or equipment in the aisle ways.

Another advantage of the present invention is that a safety netting is provided that is easy to install.

A further advantage of the present invention is that safety netting systems are provided that are simple to operate.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
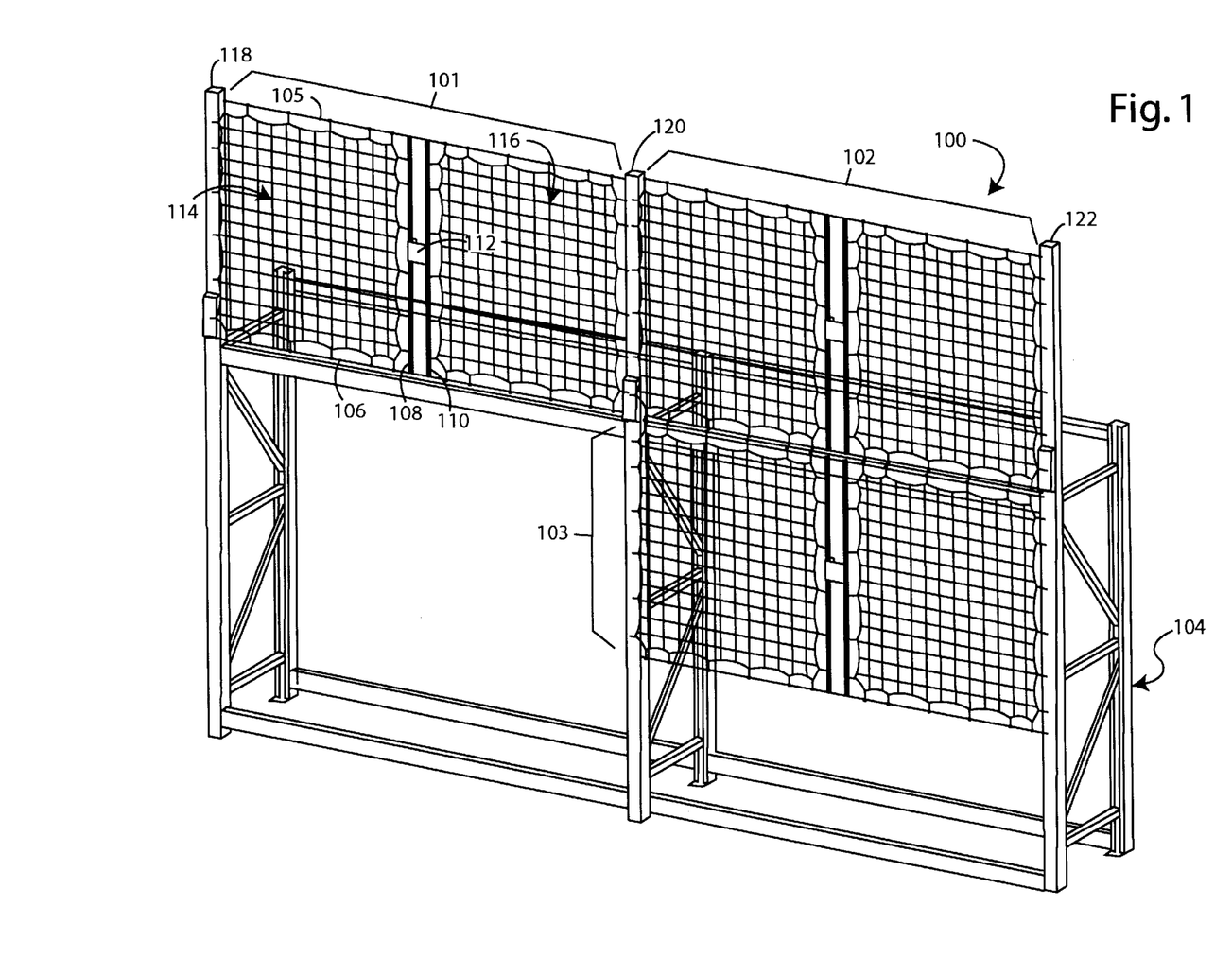
FIG. 1 is a perspective view of a non-preferred safety netting system installed on a material rack shelving unit.

FIG. 1 illustrates a safety netting system embodiment of the present invention, referred to herein by the reference numeral 100. The safety netting system 100, in this example, comprises three screened sections, 101–103, that are attached to a material rack 104. Such combination would be used in an ordinary warehouse, or in a warehouse store like The Home Depot. The principle purpose of the safety netting system 100 is to keep objects on the overhead shelves of the material rack 104 from falling down onto the floor, for whatever reason. Each of the three sections of the safety netting system 100 is exemplified by section 101, which includes a top horizontally strung wire rope 105 and a bottom strung wire rope 106. A left-screen bar 108 and a right-screen bar 110 are configured to slide along the wire ropes and close at the middle with a snap latch 112.

A left screen 114 is fixed at its left edge to the framework of the material rack 104. Similarly, a right screen 116 is fixed at its right edge at the opposite side of the shelf opening to the material rack framework. The screens comprise flexible netting of nylon rope, chain link fencing, rigid vertical links, etc. A set of posts 118, 120, and 122 are added to the top of the material rack 104 to hold aloft the top wire rope 105. Each such post may be guyed or stayed like the main mast of a sailboat if the vertical frame members of the material rack 104 cannot be supplied as one solid piece of box-beam or I-beam steel. If the loads to be secured on the top shelves are especially heavy and dangerous, it is preferable to guy and stay the posts 118, 120, and 120 in every instance.

Figure 2A:
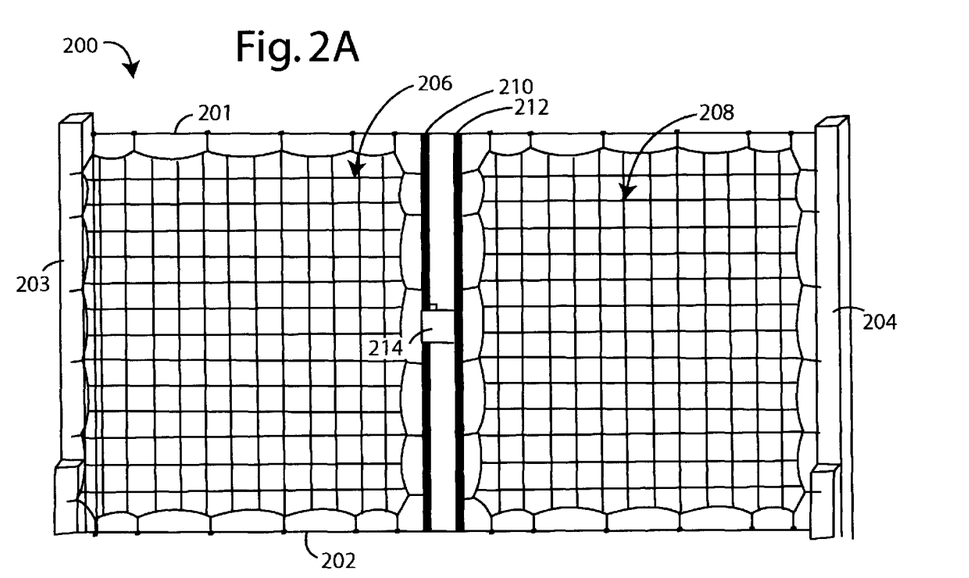
FIGS. 2A and 2B are diagrams representing the opening and closing of the screens and the use of the clasp.
Figure 2B:
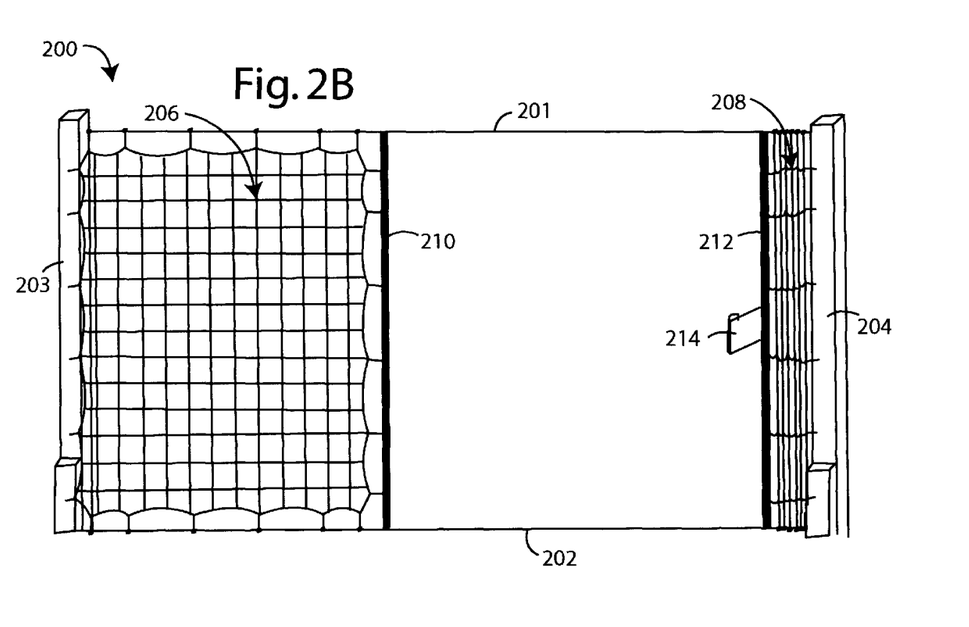

FIGS. 2A and 2B illustrate how the screens of system 100, for example, are latched together (FIG. 2A) and separated (FIG. 2B). A top and bottom pair of parallel wire ropes 201 and 202 are stretched taut between a rigid pair of vertical support posts 203 and 204. A left and a right draw screen 206 and 208 are made of flexible netting, e.g., made of nylon rope. A number of loops top and bottom allow the screens to slide left and right on the wire ropes. The left screen 206 is secured with wire loops or hooks to the left post 203. And the right screen 208 is secured at its right edge with wire loops or hooks to the right post 204. A rigid left bar 210 finishes the right edge of the left screen 206. A rigid right bar 212 similarly finishes the left edge of the right screen 208. These rigid bars help close up a gap between them and the screens when a latch 214 is secured.

Figure 3:
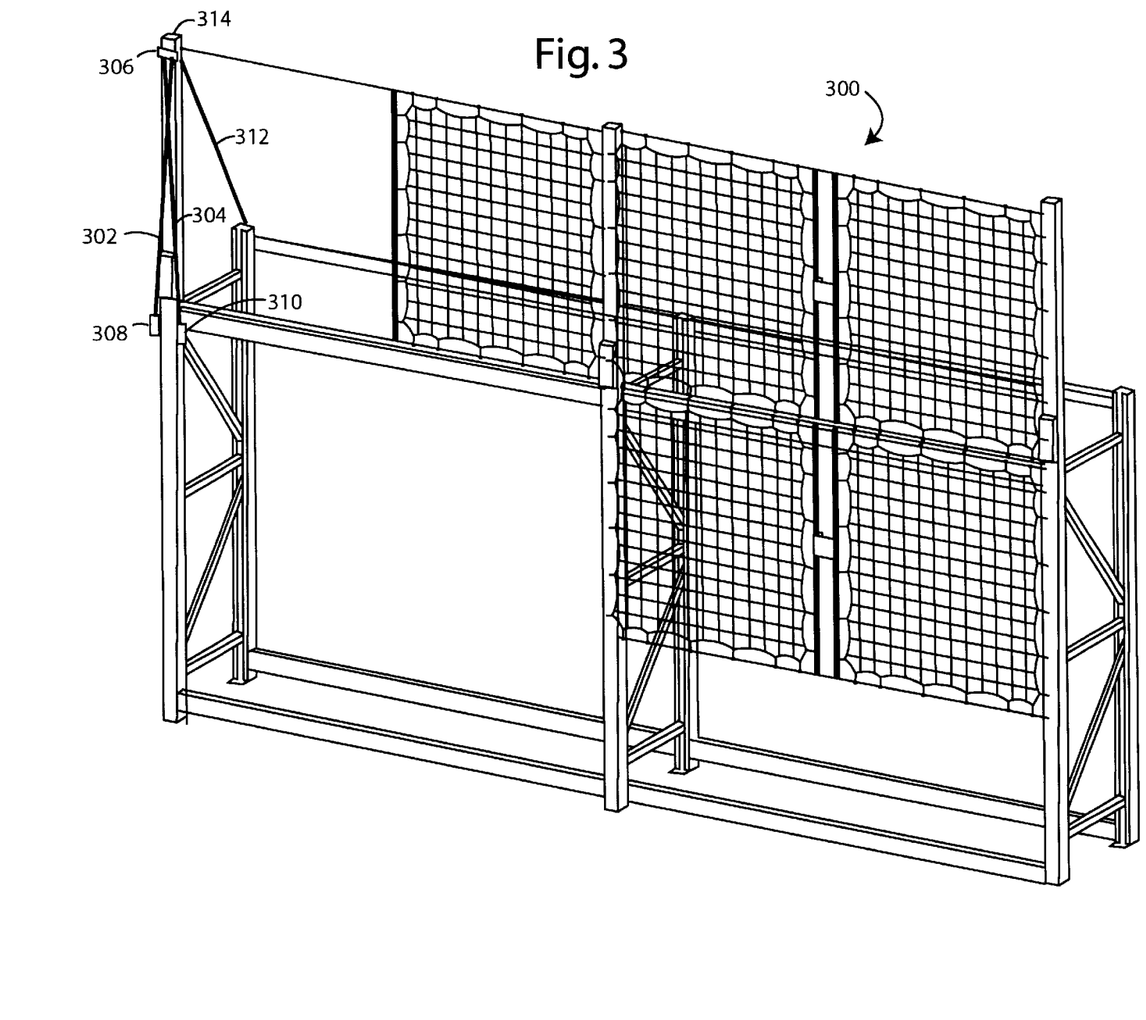
FIG. 3 is a perspective view of the safety netting system of FIG. 1 with the addition of guy wire stays that reinforce the posts above the top shelf of the material rack.

FIG. 3 shows how a vertical post can be reinforced and stiffened. In a rack storage system 300 similar to pallet system 100 in FIG. 1, a pair of wire stays 302 and 304 crisscross one another from anchor plates 306, 308, and 310. Although the wire stays 302 and 304 are shown in FIG. 3 in front of post 314, they are preferably placed behind. A back stay 312 further supports a vertical post 314. Each similar post preferably receives an identical combination of wire stays, anchor plates, and back stays. These then all resist any tendency of the posts to fold or distort under load.

Figure 4:
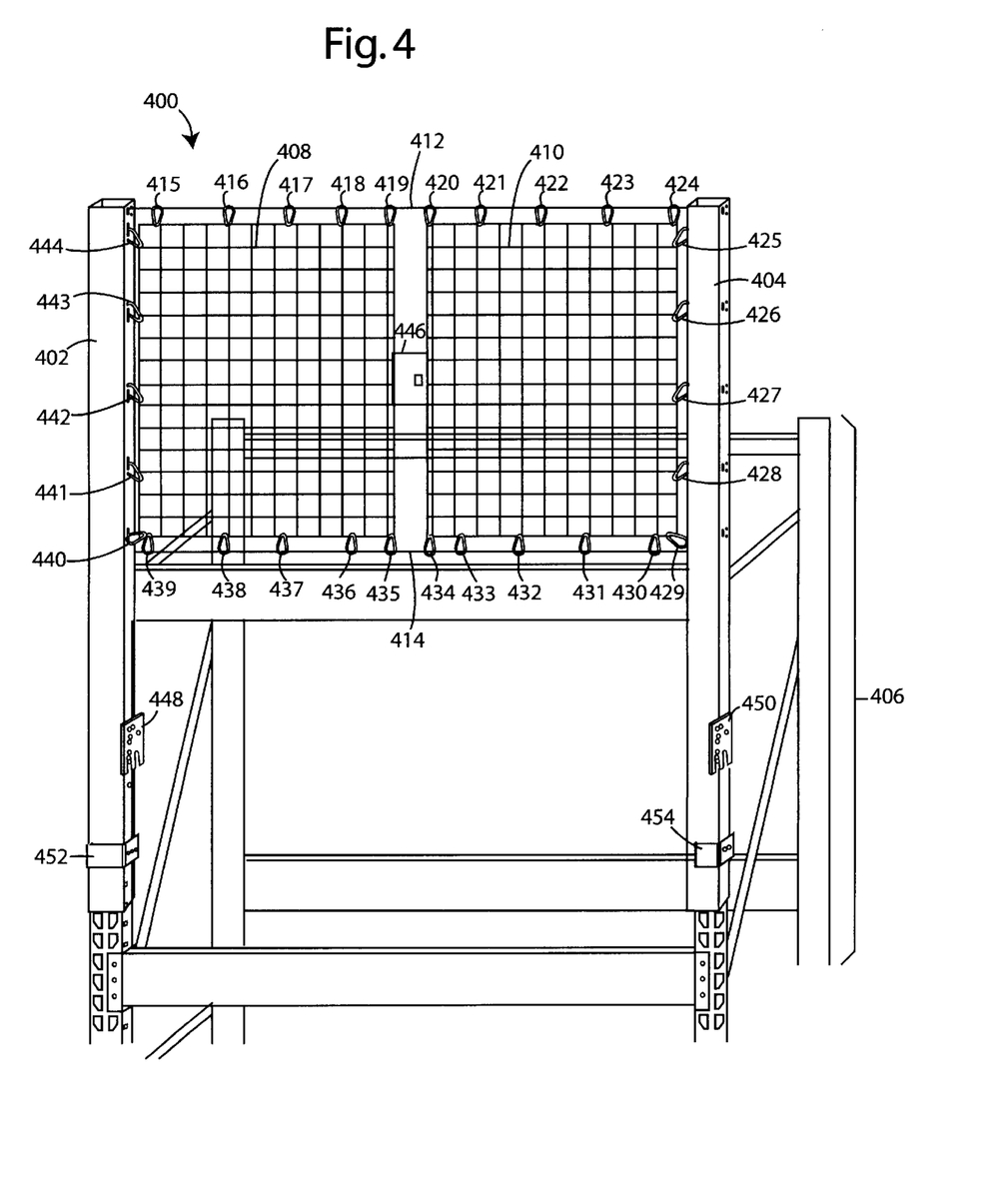
FIG. 4 is a perspective view of a preferred safety netting system embodiment of the present invention which has been installed in front and above the top of a material rack shelving unit.

FIG. 4 shows a material-rack safety-netting system in a preferred embodiment of the present invention, and is referred to herein by the general reference numeral 400. The netting system 400 comprises a pair of left and right vertical extension posts 402 and 404 that bolt to the face of the top bay 406 of a material rack. A two-part curtain netting 408 and 410 parts in the middle and is supported between horizontal, parallel top-and-bottom wire ropes 412 and 414 on hanks 415–424 and 430–439. The left and right edges of the curtain netting are secured to the vertical extension posts 402 and 404 with more hanks 425–429 and 440–444. A particularly good curtain hook to use in these applications is a stainless-steel carabiner with a spring-operated gate, e.g., as is commonly used by boaters and mountain climbers for securing ropes.

It is critical to the present invention that these hooks 425–429 and 440–444 and wire ropes 412 and 414 be attached along the middle line of the inside opposite-facing edges of the vertical extension posts 404 and 402. The front, aisle-facing edges of these vertical extension posts are smooth and no part of the curtain netting extends past them when the curtains are fully closed. This prevents snagging people and equipment in the aisle way.

A latch 446 is provided at the center to secure the two-parts of the curtain netting together. A pair of upper clips 448 and 450, and a pair of lower clips 452 and 454, with fasteners, are used to secure system 400 to the front of material bay 406.

In alternative embodiments of the present invention, the netting system 400 is positioned in front of material bay 406. The extension posts 402 and 404 would be shorter and positioned not to extend above like in FIG. 4. The posts 402 and 404 would simply frame the netting.

In further alternative embodiments of the present invention, the netting system 400 includes only one net that replaces two-part curtain netting 408 and 410. Such one piece netting would draw from either the left or right side and have a closing latch. It may also be possible to eliminate wire-rope 414, such that the netting hangs only from wire-rope 412.

Figure 5:
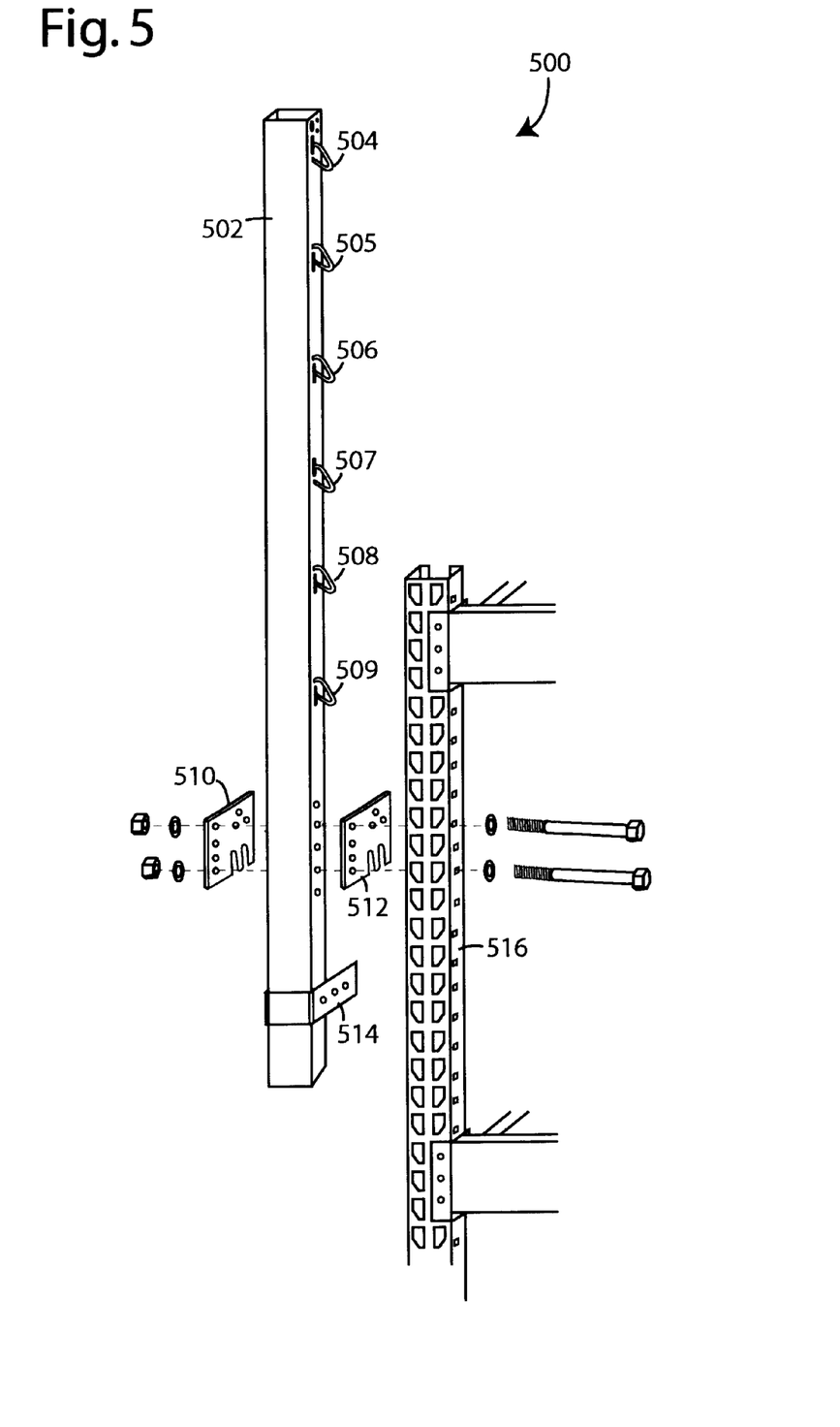
FIG. 5 is a perspective view of a vertical extension post used in the system of FIG. 4 and shows some mounting details.

FIG. 5 shows the vertical extension posts of FIG. 4 in more detail. A vertical extension post 500 comprises a box-section metal channel 502 that is fitted with a number of curtain hanks 504–509. These face toward the opposite vertical extension post, in this case the one (not pictured) to the right. A pair of attachment plates 510 and 512, and a clip 514 are bolted to the sides of a material-rack column 516 on its front face. These allow the vertical extension post 500 to resist outward shifts of any loads placed behind the closed curtain netting (FIG. 4). The clip 514 is preferably positionable all along post 502.

Figures 6A, 6B:
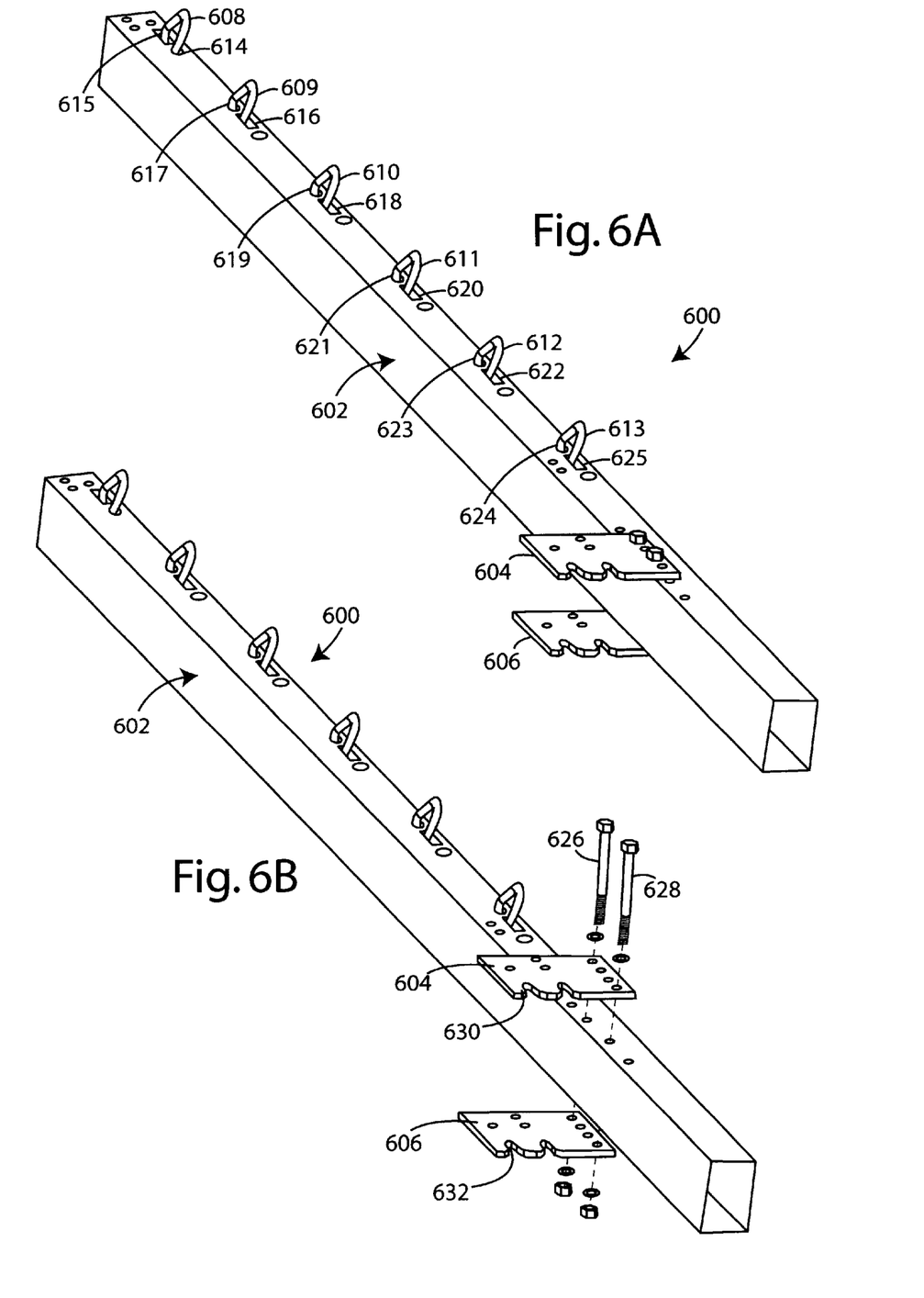
FIG. 6 is a perspective view of a vertical extension post like those used in the system of FIG. 4 and shows the inside face arrangement of carabiner-type curtain hooks.

FIGS. 6A and 6B show a vertical extension post 600 before and after having its mounting hardware attached. Such post 600 can be used in system 400 (FIG. 4). The vertical extension post 600 is constructed from a painted, steel box-tubing 602 about 2" by 3" in cross section. A pair of mounting plates 604 and 606 are used to attach it to a preexisting warehouse rack. A number of carabiners 608–613 are threaded into corresponding group of holes 614–625. The carabiners are installed by holding open their spring gates and then hooking an end into hole 614, for example, and back out hole 615. The spring gate is released and the carabiner then hangs loose ready to anchor a curtain netting. A set of fasteners 626 and 628 are used to attach the mounting plates 604 and 606 to box tubing 602. A couple of slots, e.g., slots 630 and 632, help make mounting the vertical extension post 600 easier.

The slots 630 and 632 can be used to hook a bolt on the warehouse material-rack bay to support the weight while another bolt is passed through the mounting holes.

An important feature of FIG. 6 is the collinear placement of holes 614–625 along the middle line of the inside-facing edge of box tubing 602. The carabiners 608–613 are thereby retained within the profile of the installed system 400 (FIG. 4) and help keep the edges of the curtain netting also within those same confines. Doing this helps reduce inadvertent snagging and hooking by people and equipment of the carabiners, netting, and wire roping.

Figure 7:
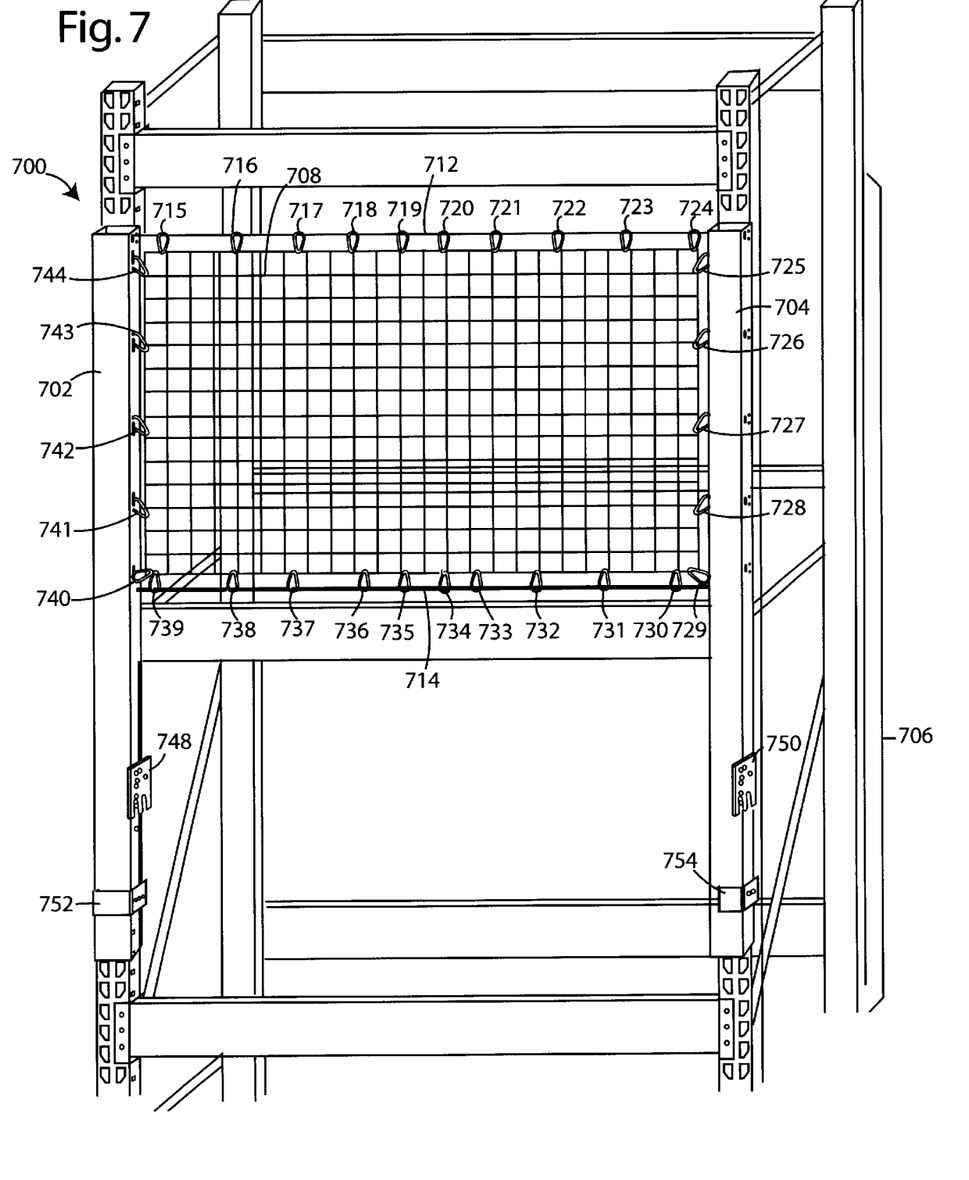
FIG. 7 is a perspective view of a first safety netting system embodiment of the present invention which has been installed on the face of a material rack shelving unit and uses top and bottom curtain wires.

FIG. 7 shows a material-rack safety-netting system in a preferred first embodiment of the present invention, and is referred to herein by the general reference numeral 700. The netting system 700 comprises a pair of left and right vertical frames 702 and 704 that bolt to the face of a material bay 706. A curtain netting 708 is supported between horizontal, parallel top-and-bottom wire ropes 712 and 714 on hanks 715–724 and 730–739. The left and right edges of the curtain netting 708 are secured to the vertical frames 702 and 704 with more hanks 725–729 and 740–744. A particularly good curtain hook to use in these applications is a stainless-steel carabiner with a spring-operated gate, e.g., as is commonly used by boaters and mountain climbers for securing ropes. A pair of upper clips 748 and 750, and a pair of lower clips 752 and 754, with fasteners, are used to secure system 700 to the front of material bay 706.

It is critical to the present invention that these hooks 725–729 and 740–744 and wire ropes 712 and 714 be attached along the middle line of the inside opposite-facing edges of the vertical frames 702 and 704. The front, aisle-facing edges of these vertical extension posts are smooth and no part of the curtain netting extends past them when the curtains are fully closed. This prevents snagging people and equipment in the aisle way.

Figure 8:
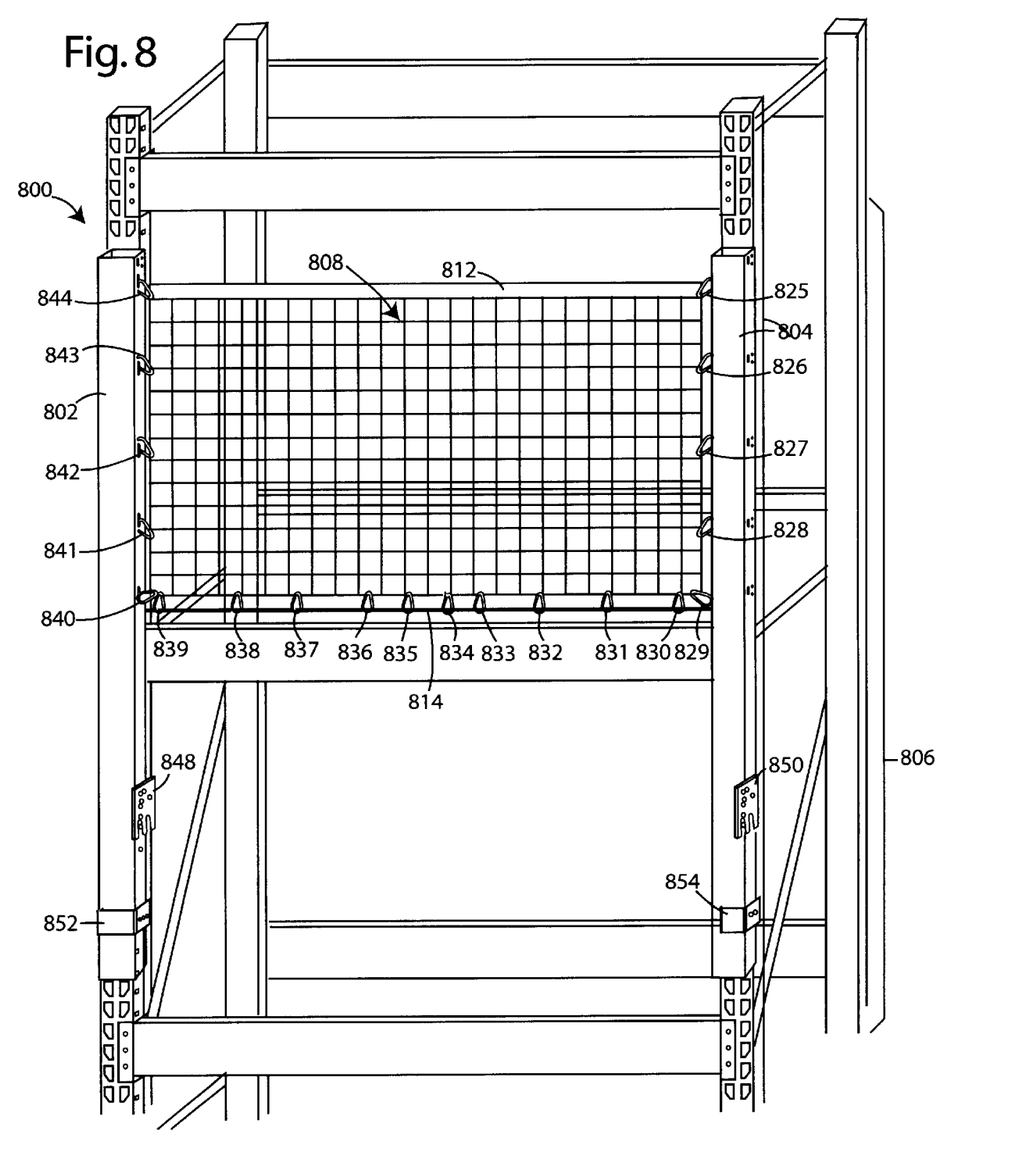
FIG. 8 is a perspective view of a second safety netting system embodiment of the present invention which has been installed on the face of a material rack shelving unit and uses only a single bottom curtain wire.

FIG. 8 shows a material-rack safety-netting system in a preferred second embodiment of the present invention, and is referred to herein by the general reference numeral 800. The netting system 800 comprises a pair of left and right vertical frames 802 and 804 that bolt to the face of a material bay 806. A curtain netting 808 is supported between a top band 812 and a bottom curtain wire 814. The right edge of curtain netting 808 is secured to the vertical frame 804 with carabiner hooks 825–828. The bottom is hanked onto the bottom curtain wire 814 with another set of carabiner hooks 829–839. The left edge of curtain netting 808 is secured to the vertical frame 802 with carabiner hooks 840–844. The netting can be opened to provide access behind by releasing all of either carabiner hooks 825–828 on the right or 840–844 on the left.

As before, a good curtain hook to use in these applications is a stainless-steel carabiner with a spring-operated gate, e.g., as is commonly used by boaters and mountain climbers for securing ropes. A pair of upper clips 848 and 850, and a pair of lower clips 852 and 854, with fasteners, are used to secure system 800 to the front of material bay 806.

It is critical to the present invention that these hooks 825–829 and 840–844, top band 812, and wire rope 814 be attached along the middle line of the inside opposite-facing edges of the vertical frames 802 and 804. The front, aisle-facing edges of these vertical extension posts are smooth and no part of the curtain netting extends past them when the curtains are fully closed. This prevents snagging people and equipment in the aisle way.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A warehouse safety device for preventing objects from falling out of a material rack, comprising:

a pair of vertical extension posts for mounting to opposite left and right sides at a front of one bay in a warehouse material rack;

a series of attachment holes disposed along a middle line of each inside opposite-facing edge of each one of the pair of vertical extension posts;

a corresponding number of carabiners threaded through pairs of ones of the series of attachment holes and providing anchor points; and     a curtain netting attached at left and right edges to respective ones of the carabiners and thus anchored by them;

wherein, the curtain netting and carabiners have reduced exposure to being snagged by people and equipment passing in an aisle way in front.

2. The warehouse safety device of claim 1, further comprising:

a pair of horizontally disposed top and bottom wire ropes for stretching between the pair of vertical extension posts at points along said middle line of each inside opposite-facing edge.

3. The warehouse safety device of claim 2, wherein:

the curtain netting further comprises a pair of left and right screens for a sliding curtain-hanger attachment between the top and bottom wire ropes such that they can be horizontally separated at the middle, and wherein outside edges of each screen are anchored at the left and right ends by the carabiners.

4. The warehouse safety device of claim 1, further comprising:

a bottom curtain wire for stretching between the pair of vertical extension posts at points along said middle line of each inside opposite-facing edge, and for attaching a bottom edge of the curtain netting.

\* \* \* \* \*